Nov. 15, 1949

C. J. NOEL 2,488,319

MICROMETER TOOL

Filed Oct. 2, 1947

INVENTOR.
Clarence J. Noel.
BY
Walter C. Ross
Attorney.

Patented Nov. 15, 1949

2,488,319

UNITED STATES PATENT OFFICE 2,488,319

MICROMETER TOOL

Clarence J. Noel, Indian Orchard, Mass.

Application October 2, 1947, Serial No. 777,535

3 Claims. (Cl. 33—163)

This invention relates to improvements in measuring apparatus and is directed more particularly to improvements in micrometer tools.

The principal object of the invention is the provision of a micrometer tool for measuring diameters within a wide range of dimensions.

The tool of the invention is adapted for many and various uses but is particularly adapted for use in measuring the inside diameter of cylinders and the like.

In the boring of cylinders and the like where a boring bar is used and extends into the cylinder, it is necessary during the boring operation to frequently check the diameter and the tool of this invention is adapted for that purpose.

It is only possible with prior art micrometers to measure diameters within a narrow range but according to this invention, it is possible by the novel construction to measure diameters within a very great range.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Figure 1:
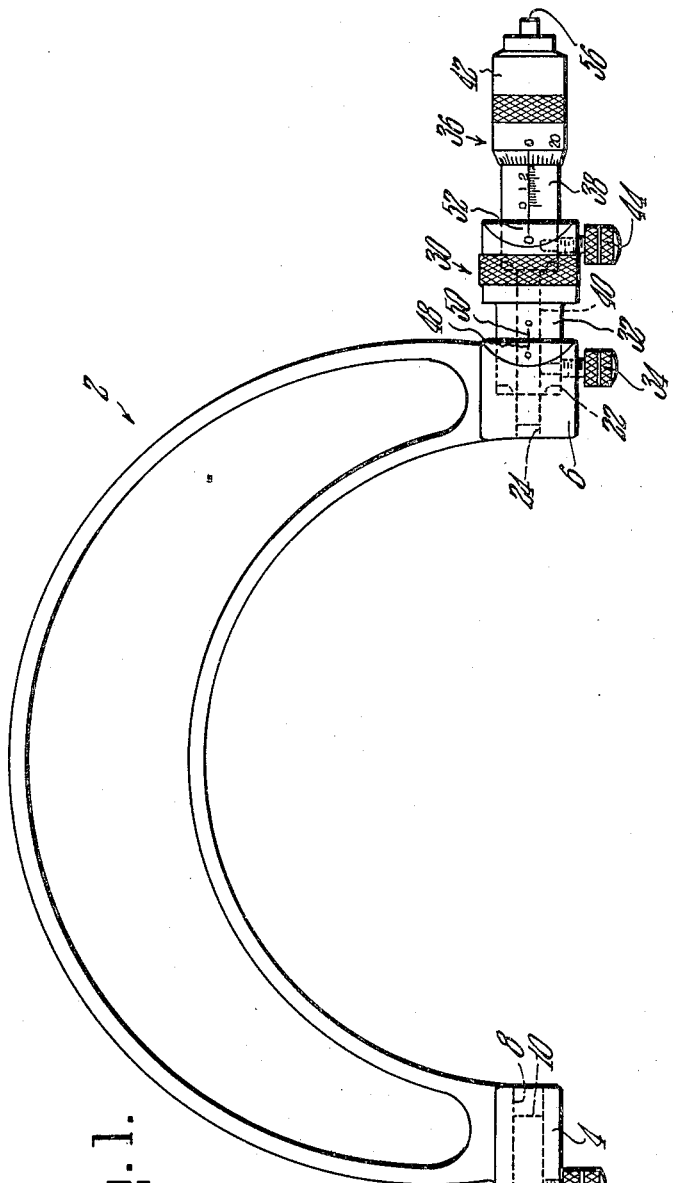
Fig. 1 is a side elevational view of a micrometer tool embodying the novel features of the invention.

Referring now to the drawings more in detail, the invention will be fully described.

A frame 2 is provided which is preferably of C form and has hubs 4 and 6 at opposite ends thereof.

The hub 4 is provided with a bore 8 adapted to receive the inner shank end 10 of a stem 12.

A collar or spacer 14 is bored to slip over the part 10 and is adapted to abut the hub 4. The stem 12 has an intermediate portion 16 providing a shoulder 18 for abutting the member 14.

A lock screw 20 in threaded engagement with the hub 4, as shown, is adapted to engage and hold the stem in place in the hub.

The hub 6 is provided with a bore 22 and a relatively smaller bore 24 which are in accurate axial alignment with the bore 10.

A holder 30 is provided which has a part 32 receivable in the bore 22 of hub 6.

A clamp screw 34 in threaded engagement with the hub 6 engages and clamps the part 32 of the holder in the bore 22 thereof.

A micrometer 36 has a body 38 which is receivable in the bore 22 of the holder and is provided with a spindle 40 which is receivable in a bore provided in the body and the bore 24 of hub 6.

A thimble member 42 of the micrometer 36 is rotatable relative to the body 38 thereof as is usual in micrometer construction for measuring purposes and graduations 44 and 46 are provided on said body 38 and member 42.

A clamp screw 44 in threaded engagement with the holder engages the micrometer body 38 to hold it in place.

Markings on the hub 6, holder 32 and body 38 as shown at 48, 50 and 52 and are provided so that the parts may be accurately related.

Outer end faces 54 and 56 on outer ends of members 12 and 42 are adapted for engaging inner surfaces of a bore to be measured.

With the parts arranged, as shown, the tool of the invention may be inserted in a cylinder being bored for measuring the diameter thereof. The frame is formed so as to not interfere with the boring bar in the cylinder.

Figure 3:
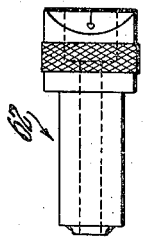
Fig. 3 is a side elevational view of one of the holders of the invention.
Figure 2:
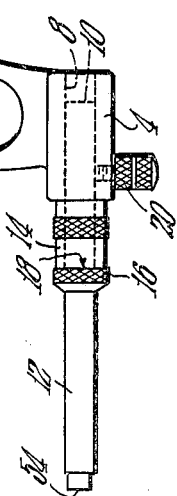
Fig. 2 is a side elevational view of one of the collars for the tool shown in Fig. 1.

There may be other spacers and holders 60 and 62 such as shown in Figs. 2 and 3. These may be of different lengths and used as may be desired for measuring diameters within a wide range.

A micrometer of itself is not ordinarily capable of measurements within a very narrow range but by providing a plurality of collars and holders in connection with the frame the narrow range of the micrometer is made use of through a very wide range.

Altogether it is possible to measure the diameters of cylinders and the like which vary in diameter through a great range.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A micrometer tool of the class described comprising in combination, a frame in the form of a C having hubs at opposite ends thereof, one of said hubs provided with a bore and a screw in threaded engagement therewith for engaging the shank of a stem, a stem having a shank at one end thereof disposed in said bore and having a shoulder intermediate its ends and an end face on its other end, collar means disposed between said shoulder of the stem and outer face of said one hub, the other of said hubs provided with a bore for receiving a holder and a second bore for receiving the spindle of a micrometer, the bores of said other hub in axial alignment with the bore of the first named hub, a screw in threaded engagement therewith for engaging a holder, holder means receivable in said holder bore and having a bore therethrough, and a micrometer having a body mounted in said holder and a member rotatable thereon having an outer end face.

2. A micrometer tool of the class described comprising in combination, a frame in the form of a C having hubs at opposite ends thereof, one of said hubs provided with a bore and a screw in threaded engagement therewith for engaging the shank of a stem, a stem having a shank at one end thereof disposed in said bore and having a shoulder intermediate its ends and an end face on its other end, collar means disposed between said shoulder of the stem and outer face of said one hub, the other of said hubs provided with a bore for receiving a holder and a second bore for receiving the spindle of a micrometer, the bores of said other hub in axial alignment with the bore of the first named hub, a screw in threaded engagement therewith for engaging a holder, holder means receivable in said holder bore and having a bore therethrough, and a micrometer having a body mounted in said holder and a member rotatable thereon having an outer end face, said collar means including a plurality of members provided with bores for receiving said shank of the stem.

3. A micrometer tool comprising in combination, a frame in the form of a C having spaced and aligned hubs at opposite ends thereof which are provided with outer transverse faces, one of said hubs provided with an axial shank bore and having a clamp screw in threaded engagement therewith for engaging the inner shank of a stem in said bore, an elongated stem having an inner shank at one end thereof disposed in said shank bore and having a shoulder intermediate its ends adjacent the outer face of said one hub and with an outer end extending from the outer face of said one hub, a collar on said shank between said shoulder and outer face of said one hub, the other of said hubs provided with a holder bore extending inwardly from the outer face thereof and with a relatively smaller spindle bore extending inwardly therefrom, the bores of said hubs being in axial alignment, a holder in said holder bore extending from the outer face of said last-named hub and having an outer face, a clamp screw in threaded engagement with said other hub engaging said holder, said holder provided with a micrometer body bore extending inwardly from an outer face thereof and with a relatively smaller spindle bore extending inwardly therefrom, said bores of the holder being in axial alignment with those of the said other hub, a clamp screw in threaded engagement with said other hub engageable with said holder, a micrometer having a body and a spindle disposed in the body and spindle bores of the holder, a thimble rotatably mounted on said micrometer body, a clamp screw in threaded engagement with said holder engageable with the body of the micrometer, and said micrometer provided with an outer transverse face on said thimble.

CLARENCE J. NOEL.

REFERENCES CITED

The following references are of record in the file of this patent:

UNITED STATES PATENTS

| Number | Name | Date |
| --- | --- | --- |
| 1,419,837 | Flachskampf | June 13, 1922 |
| 1,475,066 | Gregory | Nov. 20, 1923 |